3,264,366
PROCESS FOR PREPARING 3,4-DIMETHYLENE-1,5-HEXADIENE
Carl Albert Aufdermarsh, Wilmington, Del., assignor to E. I. du Pont de Nemours and Company, Wilmington, Del., a corporation of Delaware
No Drawing. Filed June 18, 1963, Ser. No. 288,606
5 Claims. (Cl. 260—683.15)

An object of the present invention is to provide a new process for the preparation of 3,4-dimethylene-1,5-hexadiene.

It has been found that the compound 3,4-dimethylene-1,5-hexadiene can be prepared by the process comprising contacting and reacting an isohaloprene, including 4-chloro- and 4-bromo-1,2-butadiene (isochloroprene and isobromoprene, respectively), with magnesium in the presence of an ethereal solvent, for the isohaloprene, selected from the group consisting of tetrahydrofuran, tetrahydropyran, open-chain aliphatic polyethers of the formula R—(O—CH$_2$—CH$_2$)$_x$—O—R, wherein R is C$_1$–C$_4$ alkyl and x is an integer having the value 1, 2, or 3, and mixtures thereof, and recovering the 3,4-dimethylene-1,5-hexadiene thereby formed.

It has been found that the magnesium and the specified ethers are critical reagents for operating this process. The 3,4-dimethylene-1,5-hexadiene product is not obtained when other metals, e.g., lithium, sodium, zinc, zinc-copper couple, and mercury, were substituted for magnesium. If other ethers, e.g., dialkyl monoethers, are substituted for the polyethers mentioned above, 3,4-dimethylene-1,5-hexadiene is not obtained. Similarly, if a closely related cyclic ether, such as dioxane, is used in place of the specified ethers, the desired product is not obtained.

The relative proportions of isohaloprene and magnesium are not critical. It is preferred to supply at least the theoretical amount of magnesium required, e.g., at least 0.5 gram-atom for every gram-mole of isohaloprene. Frequently it is convenient to use a large excess of the metal, preferably 100–1000% of theoretical. Thus at least 0.75–1.0 gram-atom of magnesium is used, 1.0–5.0 gram-atoms being preferred.

Representative examples of suitable

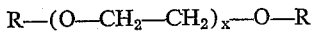

polyethers are as follows:

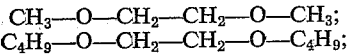
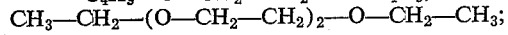
and
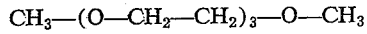

The reaction of the metal and the isohaloprene is exothermic; accordingly, it is usually preferred to add a solution of the isohaloprene in a polyether (or cyclic ether) of the specified type to a mixture of the metal and additional ether of the same type at such a rate as to maintain the desired temperature which is about 30 to about 100° C. or higher, preferably 50 to 100° C.; this step has typically required 2 hours, but the time is not critical. In some instances there may be delayed reaction; the heat evolution may commence about half to one hour after all the isohaloprene has been introduced; thus means for applying external cooling should be provided. It is preferred to supply good agitation during the reaction. After all the isohaloprene has been introduced and heat evolution has diminished, the mixture is agitated at the desired temperature for about 1 hour or more; occasionally it is convenient to regulate the temperature by maintaining reflux. The pressure is not critical; atmospheric pressure is often selected for operating convenience. Although the magnesium can be added to a solution containing all of the isohaloprene, this procedure is not as desirable because control is more difficult than during additions made in the preferred order. The reaction should be carried in an inert atmosphere, such as under nitrogen and the ethereal solvents specified should be free of Zerewitinoff-active hydrogen atoms.

In order to start the reaction, some magnesium having a clean surface should be present. Mechanical or chemical methods can be used. Typical examples of the former include scraping, cutting, crushing, grinding, ball-milling and the like. Chemical procedures involve the use of initiating ingredients which are brought in contact with magnesium and isohaloprene. Typical ingredients include mercuric chloride, a mixture of mercuric chloride and 1,2-dibromoethane, the reaction product of ethyl iodide and magnesium, and a mixture of magnesium and magnesium iodide. The ratio of magnesium to isohaloprene is not critical. The contacting is done in any of the above-specified ethers. Although the initiating ingredients can be added to the main portion of isohaloprene and magnesium, it is safer and more convenient to initiate reaction in a separate container holding a small amount of magnesium and isohaloprene, relative to the total amount of reactants, and pour the reacting mixture into the main portion of the isohaloprene and the magnesium.

In the recovery or isolation of the 3,4-dimethylene-1,5-hexadiene from the reaction mixture, insoluble metal and metal salts can be mechanically removed by filtration or centrifugation or the like. The metal thereafter can be recycled for use in the first step. The 3,4-dimethylene-1,5-hexadiene can be recovered from the remaining solution by conventional means familiar to those skilled in the art such as fractional distillation or vapor phase chromatography. If water soluble solvents such as tetrahydrofuran are employed, the reaction mixture can be washed with sufficient water to cause the formation of two liquid phases; the order of addition here is not critical. In order to avoid undesired emulsification resulting from the presence of magnesium salts, it is preferable to distill the reaction mixture prior to washing it with water.

3,4-dimethylene-1,5-hexadiene has been disclosed to be useful for making polymers and adducts with other polyenes by means of the Diels-Adler reaction. (Bailey et al., J. Org. Chem., 27, 3088 (1962).

The starting material, isochloroprene, used in the new process of the present invention to obtain the above compound is described in J. Am. Chem. Soc., 55, 2813 (1933), and in U.S.P. 1,950,431 and 2,104,789.

The following examples, in which parts and percents are by weight unless otherwise noted, are representative of the new process of the present invention.

*Example 1*

24.3 grams (1 gram-atom) of magnesium and 300 milliliters of anhydrous tetrahydrofuran were introduced into a 1-liter round-bottom flask equipped with a mechanical agitator, a reflux condenser, a nitrogen inlet, and a 250-milliliter dropping funnel. After the mixture had been heated to reflux at atmospheric pressure, 15 milliliters (0.169 gram-mole) of the isochloroprene were added from the dropping funnel. Although the mixture was stirred at reflux for forty-five minutes, no apparent reaction occured.

A test tube was loaded, in turn, with the following reagents: 0.3 gram of magnesium turnings, 5 milliliters of tetrahydrofuran, 1 milliliter of isochloroprene, 0.02 gram of mercuric chloride, and 5 drops of 1,2-dibromoethane. After this mixture had been heated over a hot plate, a reaction occurred and heat was evolved. The contents of the reaction mixture in this test tube were then poured into the 1-liter round-bottom flask of above. The reaction initiated therein rapidly became exothermic and required external cooling with ice. After the initial heat evolution had subsided, the remaining isochloroprene (135 grams, 1.521 gram-mole) was introduced over a period of 1.5 hours. During this time the reaction rate was controlled by the rate of the isochloroprene addition. At the beginning, the solution turned brown, but no precipitate appeared. After 30 minutes—½ of the isochloroprene had been added—the solution became cloudy and magnesium chloride precipitated to form a slurry. When all the isochloroprene had been added, a 5-gram portion of magnesium turnings was introduced. The mixture was then stirred for one hour at reflux and cooled to room temperature (25–30° C.).

After insoluble magnesium and magnesium chloride had been filtered off, the clear brown filtrate was then distilled. The brown filtrate was added from a 500-milliliter dropping funnel to a 1-liter round-bottom flask heated with a steam bath. Volatiles were condensed in a series of two traps cooled with Dry Ice. Condensates were then washed with 1500 milliliters of distilled water. After the aqueous layer had been removed, the organic layer (about 100 milliliters in volume) was washed three times with 300-milliliter portions of water. There remained 57 grams of clear nearly colorless oil. This oil was fractionally distilled without being dried. The 3,4-dimethylene-1,5-hexadiene was collected boiling at 59.5–60° C. (155 mm. of Hg). Analysis calculated for $C_8H_{10}$: C, 90.49; H, 9.50; molecular weight 106.2. Found: C, 90.7, 90.9; H, 9.1, 9.3; molecular weight (cryoscopic in benzene) 102, 103. The ultraviolet spectrum (determined in cyclohexane) exhibited an extinction coefficient maximum of 32,500 at 2170 angstroms.

*Example 2*

The reactor was a 250-milliliter round-bottom flask equipped with a glass agitator, a 125-milliliter dropping funnel, and a reflux condenser fitted with a nitrogen inlet. 10 grams of magnesium turnings and 50 milliliters of the dimethyl ether of diethylene glycol (distilled from sodium) were introduced into the flask and heated to 70° C. Then a solution of 25 grams of 4-chloro-1,2-butadiene and 25 milliliters of the dimethyl ether of diethylene glycol was added from a dropping funnel over a 15-minute period. No apparent reaction occurred, even after about 0.02 gram of mercuric chloride and 5 drops of 1,2-dibromoethane had also been introduced. The mixture was then heated, while agitated, for 30 minutes at 70° C. No reaction apparently occurred although the mixture turned a cloudy gray. After the mixture had been agitated more vigorously for about 10 minutes, heat evolution suddenly occurred necessitating the use of an ice bath. In about 15 minutes heat evolution moderated. Then the mixture was stirred until it had been cooled to 50° C. After the insoluble magnesium and magnesium chloride had been filtered off, the filtrate was analyzed by vapor phase chromatography. The results indicated a good yield of 3,4-dimethylene-1,5-hexadiene.

Gilman tests (No. I) of the reaction mediums in the foregoing examples were negative throughout the experiments.

As many widely different embodiments of this invention may be made without departing from the spirit and scope thereof, it is to be understood that this invention is not limited to the specific embodiments thereof except as defined in the appended claims.

What is claimed is:

1. A process for the preparation of 3,4-dimethylene-1,5-hexadiene, comprising contacting and reacting a compound selected from the group consisting of 4-chloro-1,2-butadiene and 4-bromo-1,2-butadiene with magnesium in the presence of an ethereal solvent selected from the group consisting of tetrahydrofuran, tetrahydropyran, open-chain aliphatic polyethers of the formula $$R-(O-CH_2-CH_2)_x-O-R$$

wherein R is $C_1$–$C_4$ alkyl and $x$ is an integer selected from the group consisting of 1, 2, and 3, and mixtures thereof and recovering the 3,4-dimethylene-1,5-hexadiene thereby formed.

2. The process of claim 1 wherein the compound is 4-chloro-1,2-butadiene and the solvent is tetrahydrofuran.

3. The process of claim 1 wherein the contacting and reacting step is carried out at temperatures within the range of about 30° C. to about 100° C.

4. The process of claim 1 wherein the recovering step consists of separating solids from the reaction mixture resulting from the contacting and reacting step and distilling said reaction mixture to obtain the 3,4-dimethylene-1,5-hexadiene.

5. A process for the preparation of 3,4-dimethylene-1,5-hexadiene, comprising contacting a compound selected from the group consisting of 4-chloro-1,2-butadiene and 4-bromo-1,2-butadiene with magnesium in the presence of an ethereal solvent selected from the group consisting of tetrahydrofuran, tetrahydropyran, open-chain aliphatic polyethers of the formula $$R-(O-CH_2-CH_2)_x-O-R$$

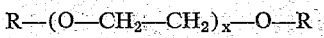

wherein R is $C_1$–$C_4$ alkyl and $x$ is an integer selected from the group consisting of 1, 2, and 3, and mixtures thereof, initiating reaction between said compound and said magnesium, and recovering the 3,4-dimethylene-1,5-hexadiene thereby formed.

No references cited.

ALPHONSO D. SULLIVAN, *Primary Examiner.*